US012641313B2

(12) United States Patent
Chen et al.

(10) Patent No.: US 12,641,313 B2
(45) Date of Patent: May 26, 2026

(54) MEDIA DOCKING DEVICE AND MEDIA TRANSFER METHOD

(71) Applicant: Realtek Semiconductor Corporation, Hsinchu (TW)

(72) Inventors: Chien-Wei Chen, Hsinchu (TW);
Tsung-Han Li, Hsinchu (TW);
You-Wen Chiou, Hsinchu (TW);
Kuan-Chi Chou, Hsinchu (TW); Bo Yu Lai, Hsinchu (TW)

(73) Assignee: Realtek Semiconductor Corporation, Hsinchu (TW)

( * ) Notice: Subject to any disclaimer, the term of this patent is extended or adjusted under 35 U.S.C. 154(b) by 371 days.

(21) Appl. No.: 18/480,522

(22) Filed: Oct. 4, 2023

(65) Prior Publication Data

US 2024/0111849 A1 Apr. 4, 2024

Related U.S. Application Data

(60) Provisional application No. 63/381,137, filed on Oct. 27, 2022, provisional application No. 63/378,239, filed on Oct. 4, 2022.

(30) Foreign Application Priority Data

Apr. 12, 2023 (TW) ................................ 112113678
Apr. 25, 2023 (TW) ................................ 112115410

(51) Int. Cl.
*H04N 21/454* (2011.01)
*G06F 1/16* (2006.01)
(Continued)

(52) U.S. Cl.
CPC ......... *H04N 21/454* (2013.01); *G06F 1/1632* (2013.01); *G06F 3/1407* (2013.01);
(Continued)

(58) Field of Classification Search
None
See application file for complete search history.

(56) References Cited

U.S. PATENT DOCUMENTS 6,175,926 B1 * 1/2001 Fogle ...................... G06F 21/31
726/19
9,883,544 B1 1/2018 Marquardt et al.
(Continued)

FOREIGN PATENT DOCUMENTS

CN     109644290 A     4/2019
CN     111324561 A     6/2020
CN     114079743 A     2/2022

*Primary Examiner* — Atta Khan
(74) *Attorney, Agent, or Firm* — CKC & Partners Co., LLC

(57) ABSTRACT

A media docking device includes an input circuit, an output circuit and a processing circuit. The input circuit is electrically connected to a media source device for receiving media data. The output circuit is electrically connected to a media play device. The processing circuit is electrically connected to the input circuit and the output circuit. The processing circuit determines if a verification procedure is passed. If the verification procedure is passed, the processing circuit transfers the media data to the media play device. If the verification procedure is not passed, the processing circuit limits a transmission of the media data, such that the media data will not be completely played by the media play device.

20 Claims, 6 Drawing Sheets

(51) Int. Cl.

| | |
|---|---|
| *G06F 3/14* | (2006.01) |
| *G06F 13/38* | (2006.01) |
| *G06F 13/42* | (2006.01) |
| *G06F 21/31* | (2013.01) |
| *G06F 21/32* | (2013.01) |
| *H04N 21/4363* | (2011.01) |

(52) U.S. Cl.
CPC ........ *G06F 13/382* (2013.01); *G06F 13/4282* (2013.01); *G06F 21/31* (2013.01); *G06F 21/32* (2013.01); *H04N 21/43632* (2013.01); *G06F 2213/0042* (2013.01)

(56) References Cited

U.S. PATENT DOCUMENTS

| | | | | |
|---|---|---|---|---|
| 2009/0063744 A1* | 3/2009 | Krueger | ................ | G06F 9/4411 |
| | | | | 710/303 |
| 2010/0071076 A1* | 3/2010 | Gangotri | ......... | G11B 20/00086 |
| | | | | 726/32 |
| 2013/0113697 A1 | 5/2013 | Chang | | |
| 2014/0059263 A1* | 2/2014 | Rosenberg | ........... | G06F 1/1632 |
| | | | | 710/303 |
| 2015/0087272 A1 | 3/2015 | Palamara et al. | | |
| 2017/0039387 A1* | 2/2017 | Leonardi | ............... | H04W 12/02 |
| 2019/0034668 A1* | 1/2019 | Novoa | .................. | G06F 1/1632 |
| 2019/0340137 A1* | 11/2019 | Hall | ...................... | G06F 1/3231 |
| 2022/0066531 A1* | 3/2022 | Huang | ................. | G06F 1/1632 |
| 2022/0214978 A1* | 7/2022 | Roose | .................. | G06F 1/1632 |
| 2022/0270062 A1* | 8/2022 | Sasaki | ............... | G06Q 20/1235 |

* cited by examiner

MEDIA DOCKING DEVICE AND MEDIA TRANSFER METHOD

RELATED APPLICATIONS

This application claims priority to U.S. Provisional Application Ser. No. 63/378,239 filed Oct. 4, 2022, U.S. Provisional Application Ser. No. 63/381,137 filed Oct. 27, 2022, Taiwan Application Serial Number 112113678, filed Apr. 12, 2023, and Taiwan Application Serial Number 112115410, filed Apr. 25, 2023, the disclosures of which are incorporated herein by reference in their entireties.

BACKGROUND

Field of Invention

The present disclosure relates to a media docking device that can enhance information security.

Description of Related Art

In business and office use, it has become common to use a docking station to connect a notebook computer to connect to multiple displays (i.e., display devices). A user can move the notebook computer to different locations where the docking stations and the displays are set up, making it convenient to use larger screens. However, the docking stations are typically small and easily stolen, and third parties may connect an additional device to the docking stations to capture transmitted data. These scenarios have information security issues.

SUMMARY

Embodiments of the present disclosure provide a media docking device including an input module, an output module, and a processing module. The input module is configured to be electrically connected to a media source device and receive media data from the media source device. The output module is configured to be electrically connected to a media play device. The processing module is electrically connected to the input module and the output module and configured to determine whether a verification procedure is passed. If the verification procedure is passed, the processing module is configured to transmit the media data to the media play device through the output module. If the verification procedure is not passed, the processing module is configured to limit a transmission of the media data such that the media data is not completely played by the media play device.

From another aspect, embodiments of the disclosure provide a media transfer method including: transmitting, by a media source device, media data to a media docking device which is electrically connected to a media play device; determining, by the media docking device, whether a verification procedure is passed; if the verification procedure is passed, transmitting, by the media docking device, the media data to the media play device; and if the verification procedure is not passed, limiting, by the media docking device, a transmission of the media data such that the media data is not completely played by the media play device.

BRIEF DESCRIPTION OF THE DRAWINGS

The invention can be more fully understood by reading the following detailed description of the embodiment, with reference made to the accompanying drawings as follows.

DETAILED DESCRIPTION

Specific embodiments of the present invention are further described in detail below with reference to the accompanying drawings, however, the embodiments described are not intended to limit the present invention and it is not intended for the description of operation to limit the order of implementation. Moreover, any device with equivalent functions that is produced from a structure formed by a recombination of elements shall fall within the scope of the present invention. Additionally, the drawings are only illustrative and are not drawn to actual size.

The using of "first", "second", "third", etc. in the specification should be understood for identifying units or data described by the same terminology, but are not referred to particular order or sequence.

Figure 1A:
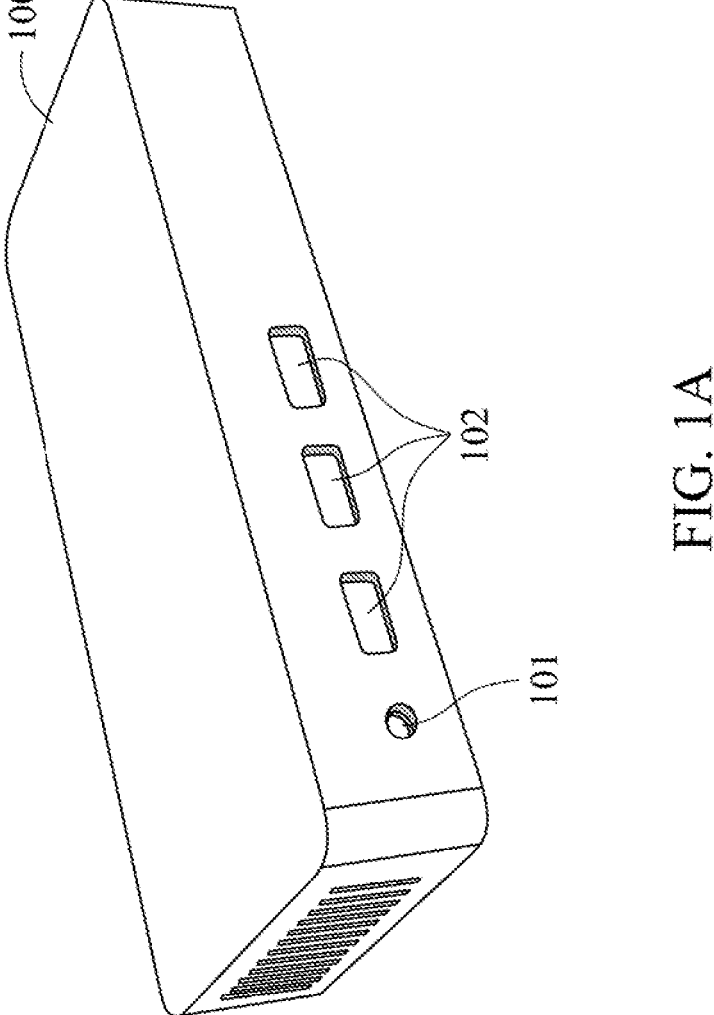
FIG. 1A and FIG. 1B are diagrams illustrating external views of a media docking device 100 according to an embodiment.
Figure 1B:
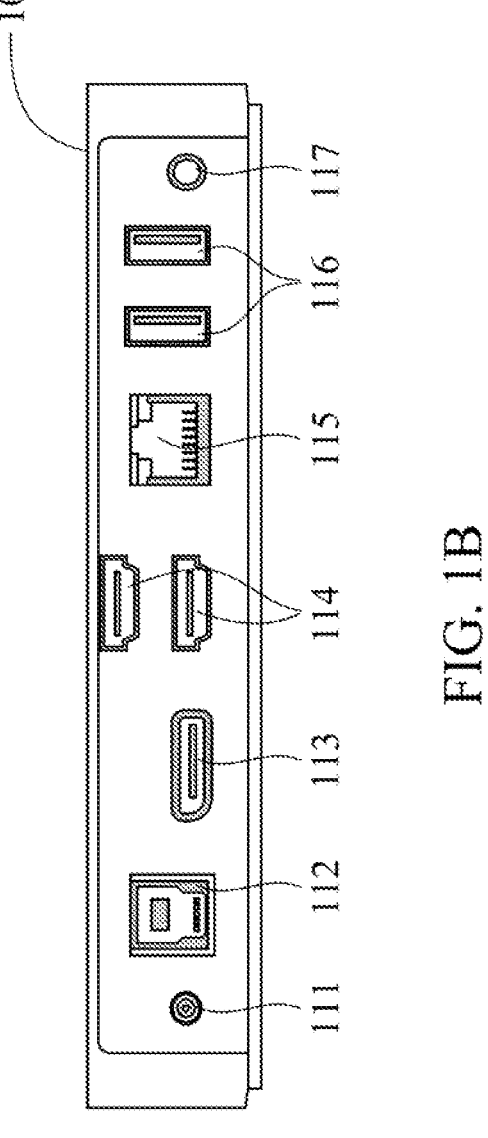
Figure 2:
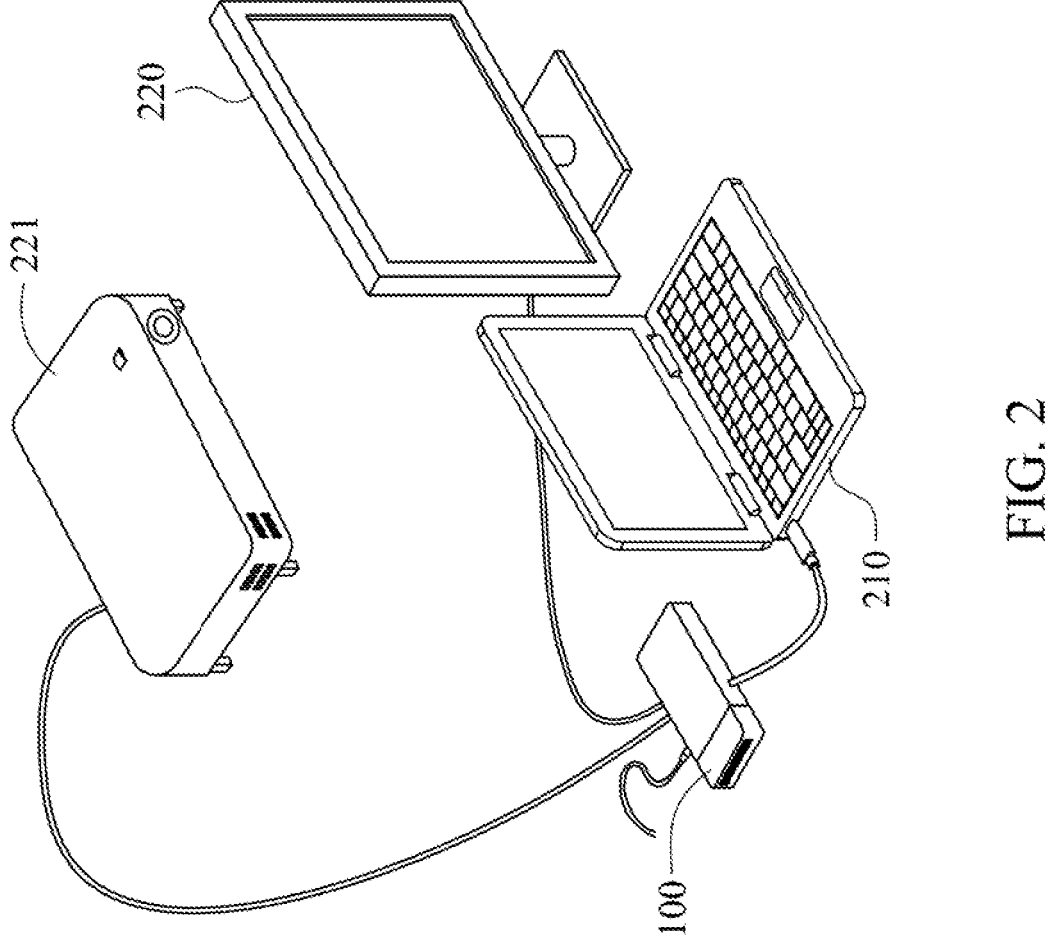
FIG. 2 is a diagram illustrates a usage scenario of the media docking device.

FIG. 1A and FIG. 1B are diagrams illustrating external views of a media docking device 100 (e.g., may also be referred to as a hub) according to an embodiment. In the examples of FIG. 1A and FIG. 1B, a front side of the media docking device 100 includes a combo aux interface 101 and multiple Universal Serial Bus (USB) interfaces 102. A back side of the media docking device 100 includes a power interface 111, a Universal Serial Bus (type-B) interface 112, a display port (DP) interface 113, a High Definition Multimedia Interface (HDMI) interface 114, an Ethernet interface 115, a Universal Serial Bus (type-A) interface 116, and an audio output interface 117. FIG. 2 illustrates a usage scenario of the media docking device 100, which is electrically connected to a media source device 210 and two media play (e.g., playback, display) devices 220 and 221. The media source device 210, for example, can be a notebook computer, while the media play devices 220 and 221 can be a display screen and a projector, respectively. The media source device 210 provides media data, which can include audio signals, video signals, or data signals, that are transmitted via the media docking device 100 to the media play devices 220 and 221.

Types, number, and placement of the interfaces on the media docking device 100 described above are merely examples, and the present disclosure is not limited to these configurations. In some embodiments, the media docking device 100 is implemented as an internal circuit or an external add-on device of an electronic device. The present disclosure also does not limit a size and appearance of the media docking device 100. In other embodiments, the media source device 210 is an electronic product such as a smartphone, a tablet, or a desktop computer.

Figure 3:
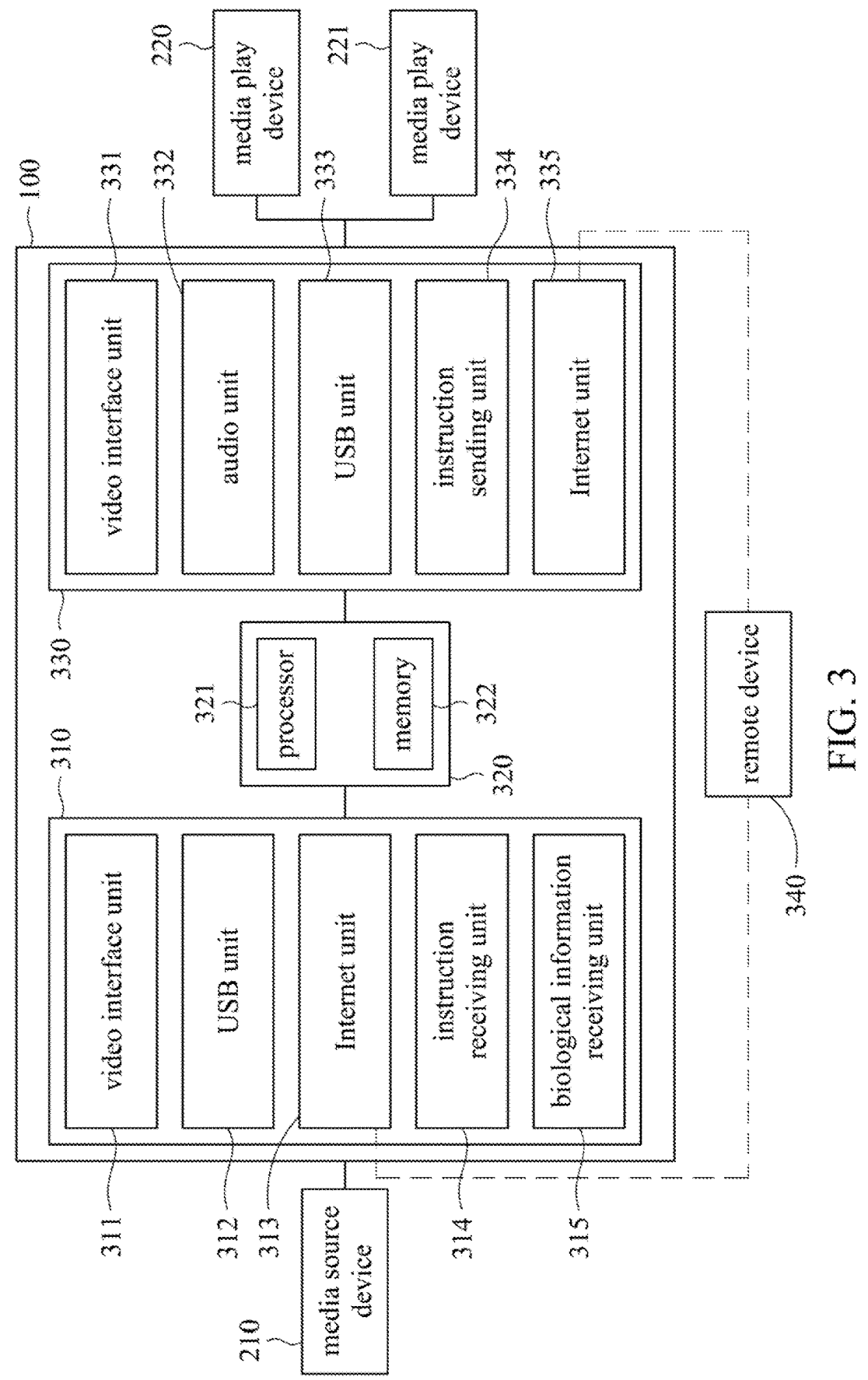
FIG. 3 is a schematic diagram of the internal architecture of the media docking device according to an embodiment.

FIG. 3 illustrates a schematic diagram of an internal architecture (e.g., internal circuitry) of the media docking device 100 according to an embodiment. Referring to FIG. 3, the media docking device 100 includes an input module 310, a processing module 320, and an output module 330. The processing module 320 is electrically connected to the input module 310 and the output module 330. The input module 310 is used to be electrically connected to the media source device 210 and to receive media data from the media source device 210. The output module 330 is used to be electrically connected to the media play devices 220 and 221.

The input module 310 includes a video interface unit 311, a Universal Serial Bus (USB) unit 312, an Internet unit 313, an instruction (e.g., command) receiving unit 314, and a biological (e.g., biometric) information receiving unit 315. The video interface unit 311, for example, is a circuit that complies with DisplayPort (DP), High-Definition Multimedia Interface (HDMI), or Digital Visual Interface (DVI) specification(s). The USB unit 312 is a circuit that complies with USB specification(s). The Internet unit 313 is a circuit that complies with Ethernet specification(s). The instruction receiving unit 314 is configured to receive an instruction from the media source device 210. In some embodiments, the instruction receiving unit 314 is a circuit under a structure of the video interface unit 311 or the USB unit 312. For example, the HDMI specification defines Consumer Electronics Control (CEC), which can be used to transmit instructions. Therefore, the instruction receiving unit 314 may be hardware that complies with the CEC specification. Additionally, the DisplayPort (DP) specification defines an Auxiliary Channel that can be used for bidirectional message transmission, so the instruction receiving unit 314 can also be hardware or firmware that complies with the Auxiliary Channel specification. Alternatively, the instruction receiving unit 314 can also be integrated with the USB. In some embodiments, the media docking device 100 is implemented on a circuit board, and the instruction receiving unit 314 is implemented as an Inter-Integrated Circuit (I2C) or firmware. In some embodiments, the instruction receiving unit 314 is a Display Data Channel Command Interface (DDC/CI). The USB unit 312 and Internet unit 313 mentioned above are optional and can be set up according to user's needs.

The biological information receiving unit 315 is configured to receive biological information, such as fingerprint(s), iris(es), and facial model(s). In some embodiments, device(s) used to capture the biological information such as the fingerprint(s), the iris(es), or the facial model(s) may be located outside the media docking device 100, and the biological information is transmitted to the biological information receiving unit 315. In other embodiments, the device(s) used to capture the biological information such as the fingerprint(s), the iris(es), or the facial model(s) are integrated into the media docking device 100, for example, by being disposed on a top or side of the media docking device 100 to facilitate the user's input of biological information.

In some embodiments, the input module 310 also includes circuit(s) or module(s) that complies with communication specifications such as cellular networks, near field communication, infrared communication, Bluetooth, and wireless fidelity (Wi-Fi). In some embodiments, the input module 310 also includes interface(s) such as fiber optic interface(s) and Musical Instrument Digital Interface (MIDI). The interfaces and buses described above are merely examples, and the present disclosure is not limited to the embodiments described above.

The processing module 320 includes a processor 321 and memory 322. The processor 321 may be a central processing unit, microprocessor, microcontroller, application-specific integrated circuit, or the like. The memory 322 can be random access memory, read-only memory, flash memory, or the like.

The output module 330 includes a video interface unit 331, an audio unit 332, a USB unit 333, an instruction sending unit 334, and an Internet unit 335. The video interface unit 331, the USB unit 333, the instruction sending unit 334, and the Internet unit 335 are similar to the video interface unit 311, the USB unit 312, the instruction receiving unit 314, and the Internet unit 313 respectively, but are used to send media data. In some embodiments, the instruction sending unit 334 and the Internet unit 335 are integrated with the instruction receiving unit 314 and the Internet unit 313 respectively. The audio unit 332 may be a TRS (Tip-Ring-Sleeve) or TS (Tip-Sleeve) terminal, or an interface that complies with the MIDI specification. However, the present disclosure is not limited to these embodiments. The audio unit 332, the USB unit 333, and the Internet unit 335 mentioned above are optional and can be set up based on the user's needs.

In the embodiment, the processing module 320 determines whether a verification procedure is passed for identifying if the media source device 210 and the media play devices 220, 221 are trusted devices. If the verification procedure is passed, the media data from the media source device 210 is transferred to the media play devices 220 and 221 through the output module 330, which means the media data is played (e.g., displayed) normally. If the verification procedure is not passed, it means that the media source device 210 or the media play devices 220, 221 are untrusted, so the processing module 320 will limit (for example, stop or block) the transmission of the media data. Multiple embodiments will be provided below to illustrate the verification procedure.

In some embodiments, the verification procedure includes the processing module 320 determining whether a connection status of the media source device 210 or the media play devices 220, 221 has changed. In detail, the processing module 320 determines whether the media source device 210 or the media play devices 220, 221 had their video interface connector(s) plugged or unplugged, power cord(s) plugged or unplugged, or power suppl(ies) turned on or off. If the connection status is determined to have changed, it indicates that the verification procedure is not passed, and thus the processing module 320 will limit the transmission of the media data, preventing the media data from being completely played (e.g., displayed) by the media play devices 220, 221 until a subsequent password verification is passed. There are various ways to limit the transmission of the media data. For example, when the media data is video, a part or all of the video is masked with black or a specific pattern, preventing the user from viewing complete video content of the media data on the media play devices 220, 221. In some embodiments, the processing module 320 disables the input module 310 and/or the output module 330, preventing the media data from being transmitted to the media play devices 220, 221. For instance, the processing module 320 can turn off the power supply of the input module 310 and the output module 330 or issue instructions to stop their operations. In some embodiments, when the media play device 220 is a screen, the processing module 320 can issue instruction(s) to the media play device 220 to turn off a backlight module, a power supply, or a panel operation of the screen, preventing the media data from being played by the media play device 220. In some embodiments, the media data is restricted to play for a limited time (e.g., one minute) and then will be masked. In some embodiments, the processing module 320 adds warning message(s) or arbitrary pattern(s) and symbol(s) to the media data.

In some embodiments, the above-mentioned verification procedure includes determining whether the media source device 210 and/or the media play devices 220, 221 are included on a white list. The devices can be identified through their Media Access Control (MAC) addresses, device identification codes, or any other identification codes. If they are on the white list, it indicates that the verification procedure is passed; otherwise, it indicates that the verification procedure is not passed. If a third party connects the media docking device 100 to an untrusted device (not on the white list), the media data cannot be played normally. This can help protect confidential information from being leaked or prevent untrusted third parties from controlling the played content.

In some embodiments, it can be determined whether all devices are on the white list, or only the media source device 210 is on the white list, or only the media play devices 220, 221 are on the white list. Which verification procedure is adopted can be determined by the user. In such embodiments, the media source device 210 is a computer that runs an application providing a user interface. This user interface offers the user multiple modes of the verification procedure for the user to choose from.

Figure 4:
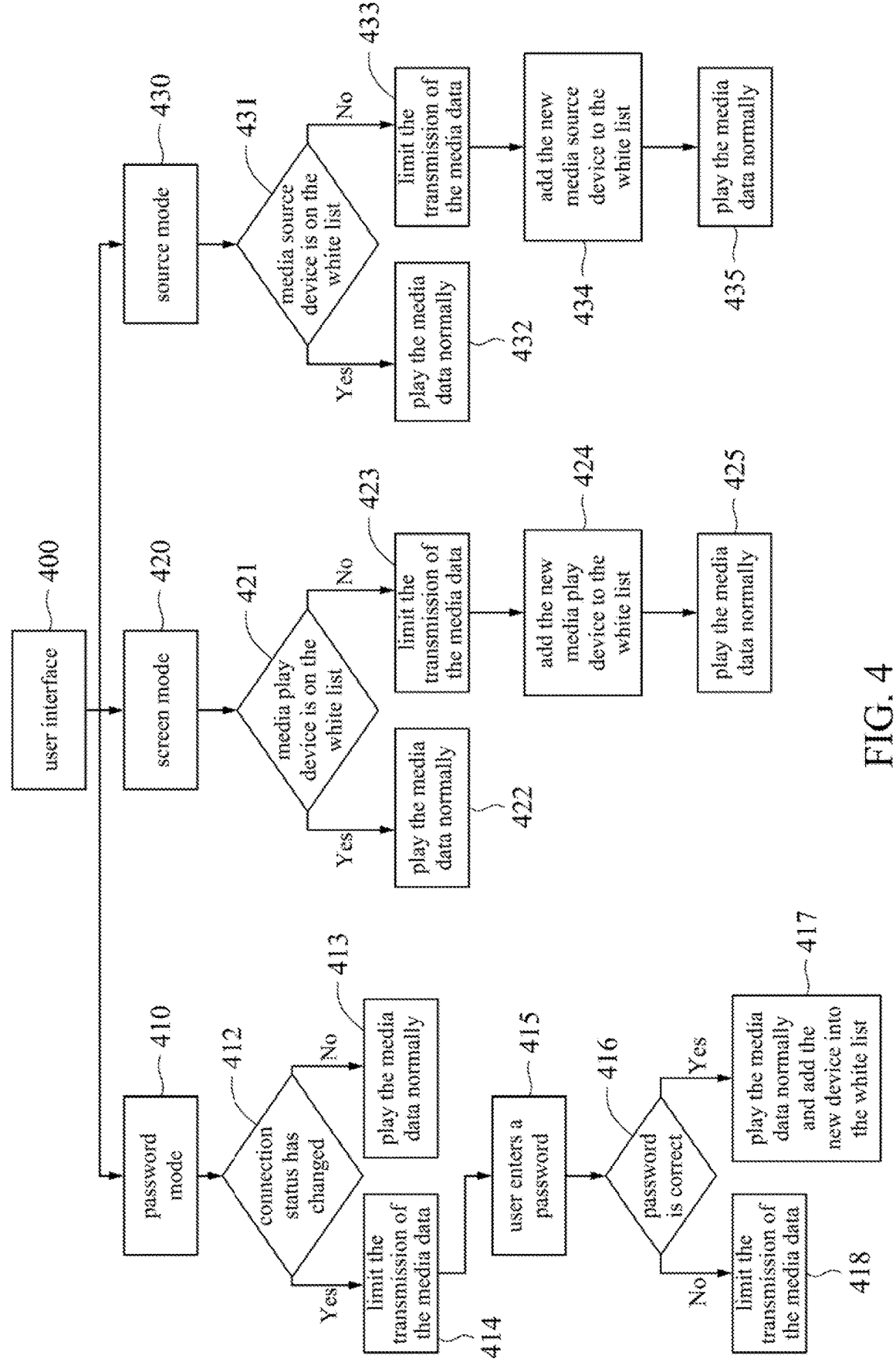
FIG. 4 is a schematic diagram illustrating three modes according to an embodiment.

FIG. 4 is a schematic diagram illustrating three modes according to an embodiment. Refer to FIGS. 3 and 4, a user interface 400 provides a password mode 410, a screen mode 420, and a source mode 430 for selection.

In step 412 of the password mode 410, the processing module 320 determines whether the current connection status of the media source device 210 and the media play devices 220, 221 has changed. Here, the change of the status includes plugging or unplugging the video interface connector(s), plugging or unplugging the power cord(s), or turning the power suppl(ies) on or off. For example, the processing module 320 can determine whether the video interface connector(s) of the media source device 210 and the media play devices 220, 221 currently connected have been plugged or unplugged. If not, it indicates that the connection status has not changed, and in step 413, the media data is played normally. If the connection status has changed, in step 414, the processing module 320 limits the transmission of the media data. Next, in step 415, the user interface may prompt the user to enter a password. The entered password (also referred to as a second password) will be sent to the input module 310. The processing module 320 stores a pre-set password (also referred to as a first password). In step 416, the processing module 320 determines whether the entered password is correct (whether the second password is the same as the first password). If the entered password is correct (the same), in step 417, the media data is transmitted to the media play devices 220, 221 for normally playing the media data, and add the newly connected devices into the white list. If the entered password is incorrect (not the same), in step 418, the processing module 320 limits the transmission of the media data. In some embodiments, the processing module 320 also sends the password comparison results back to the media source device 210 for subsequent operations. In some embodiments, when the entered password is incorrect, it indicates possibility of intrusion by the third party. The processing module 320 can interrupt the communication connection and the transmission of the media data between the input module 310 and the media source device 210, or interrupt the communication connection and the transmission of the media data between the output module 330 and the media play devices 220, 221.

In some embodiments, in step 415, the user's biological information (also referred to as second biological information) is captured through the biological information receiving unit 315. The processing module 320 also stores pre-established biological information (also referred to as first biological information). In step 416, the processing module 320 determines whether the first biological information and the second biological information matches. If the two biological information matches, step 417 is executed; otherwise, step 418 is executed.

In step 421 of the screen mode 420, it is determined whether the currently connected media play device is on the white list. If the result of step 421 is yes, the media data is displayed normally in step 422. If the result of step 421 is no, the processing module 320 limits the transmission of the media data in step 423. The user then enters a password (or biological information). When the password is correct, the user can edit the white list in step 424 to add the new media play device to the white list. Therefore, when the media play device is connected again later, it can pass the comparison with the updated white list and display the media data normally without entering the password. In step 425, the media data is displayed normally. If the password entered by the user is incorrect, steps 424 and 425 will not be executed.

In step 431 of the source mode 430, it is determined whether the currently connected media source device is on the white list. If the result of step 431 is yes, the media data is displayed normally in step 432. If the result of step 431 is no, the processing module 320 limits the transmission of the media data in step 433. The user then enters a password (or biological information). When the password is correct, the user can edit the white list in step 434 to add the new media source device to the white list. Therefore, when the media source device is connected again later, it can pass the comparison with the updated white list and display the media data normally without entering the password. In step 435, the media data is displayed normally. If the password entered by the user is incorrect, steps 434 and 435 will not be executed.

Refer to FIG. 3, in some embodiments, the internet unit 313 and internet unit 335 establish a communication connection with a remote device 340. The remote device 340, such as a server or any computer system, can be operated by information security personnel. The information security personnel can enter a password on a user interface provided by the remote device 340 and then send instruction(s) to the internet unit 313 through the Internet, thereby editing the white list stored in the media docking device 100. The editing may include adding or deleting device(s), setting device permission(s), etc., and is not limited in the disclosure. In some embodiments, when the media docking device 100 detects a device not on the white list, or the user enters an incorrect password on the media source device 210, the processing module 320 can send an error message to the remote device 340 (for example, to notify the user) via the internet unit 335. This error message can include any text(s), number(s), pattern(s), symbol(s), or binary data, and is not limited in the disclosure.

In this embodiment, the media docking device 100 is connected to the media play devices 220 and 221. The media source device 210 or the remote device 340 can provide a user interface, allowing the user to decide which one of the media play devices 220 and 221 to use for playing the media data. Alternatively, the user can set one of the media play devices 220 and 221 to play normally and the other one of the media play devices 220 and 221 not to play. The number of connected media play devices is not limited in the disclosure.

In some embodiments, there are multiple white lists, with one white list recording trusted media source device(s) and another white list recording trusted media play device(s).

Figure 5:
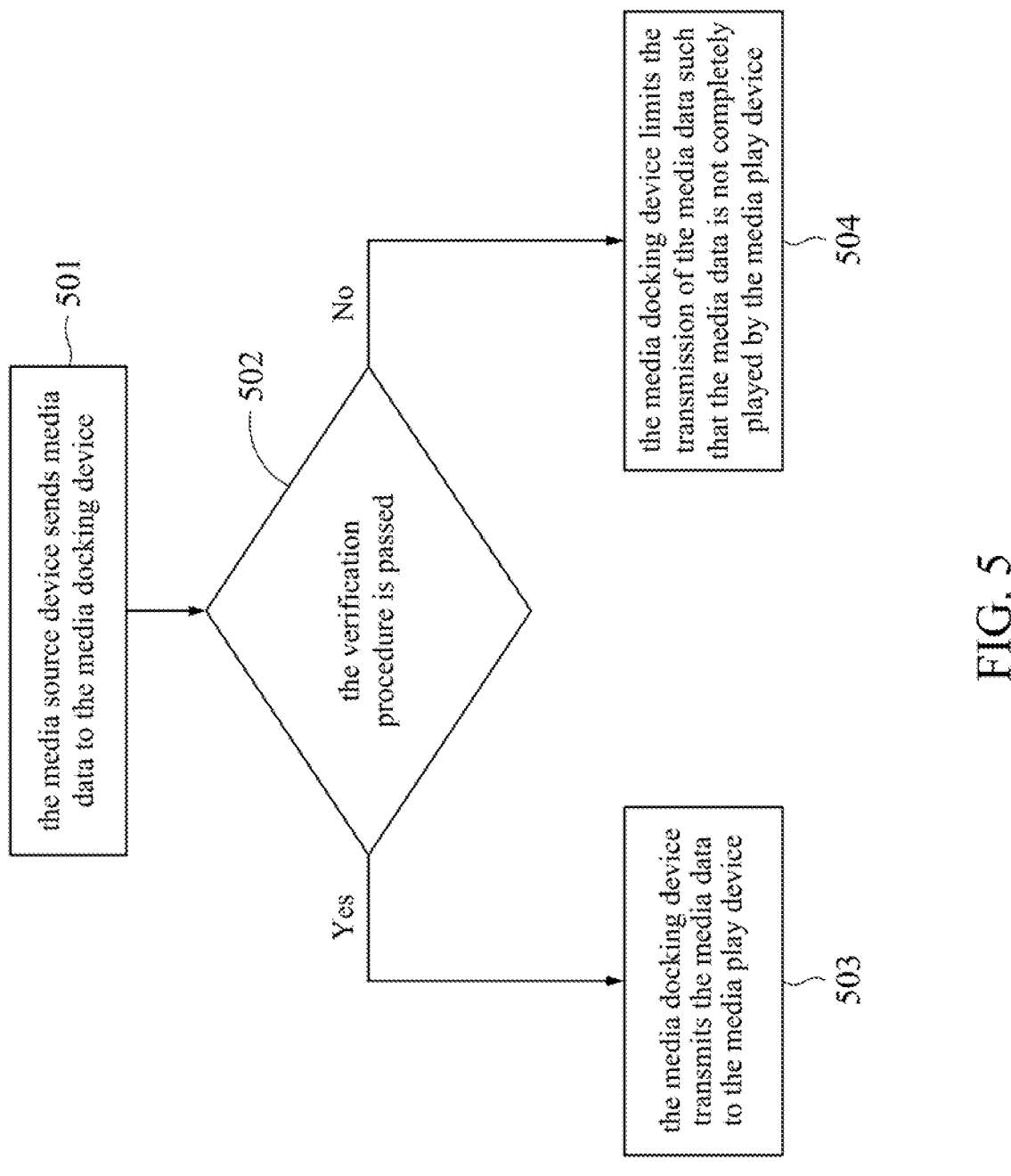
FIG. 5 is a flowchart illustrating a media transfer method according to an embodiment.

FIG. 5 is a flowchart illustrating a media transfer method according to an embodiment. Referring to FIG. 5, the media transfer method is executed by the media docking device 100. In step 501, the media docking device 100 receives the media data from the media source device 210. In step 502, it is determined whether the verification procedure is passed. In some embodiments, the verification procedure determines whether the connection status of the media source device 210 and media play device 220 has changed; if there is no change, it means the verification procedure is passed, otherwise it is not passed. In some embodiments, the verification procedure determines whether the aforementioned second password is the same as the first password; if they are the same, it means the verification procedure is passed, otherwise it is not passed. In other embodiments, the verification procedure determines if both the media source device 210 and media play device 220 are on the white list, or only determines whether the media source device 210 is on the white list, or only determines whether the media play device 220 is on the white list. In some embodiments, the verification procedure determines if two biological information matches; if they do, it means the verification procedure is passed, otherwise it is not passed. If the verification procedure is passed, in step 503, the media docking device 100 transmits the media data to the media play device 220, allowing the media play device 220 to play (e.g., display) the media data normally. If the verification procedure is not passed, in step 504, the media docking device 100 limits the transmission of the media data such that the media data will not be completely played by the media play device 220. All the steps in FIG. 5 have been described in detail above, and therefore the description will not be repeated. Note that the steps in FIG. 5 can be implemented as program codes or circuits, and the disclosure is not limited thereto. In addition, the method in FIG. 5 can be performed in conjunction with the aforementioned embodiments, or can be performed alone. In other words, other step(s) may be inserted between the steps of the FIG. 5.

The above-disclosed media docking device and method can enhance the information security of the media docking device and prevent third parties from intercepting the media data.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A media docking device comprising:
an input circuit, configured to be electrically connected to a media source device and configured to receive media data from the media source device;
an output circuit, configured to be electrically connected to a media play device; and a processing circuit, configured to be electrically connected to the input circuit and the output circuit and configured to determine whether a verification procedure is passed for identifying if the media source device and the media play device are trusted devices,
wherein if the verification procedure is passed, the processing circuit is configured to transmit the media data to the media play device through the output circuit,
wherein if the verification procedure is not passed, the processing circuit is configured to limit a transmission of the media data such that the media data is not completely played by the media play device.

2. The media docking device of claim 1, wherein the input circuit comprises at least one of following circuits:
a video interface circuit;
a universal serial bus circuit;
an internet circuit; and
an instruction receiving circuit.

3. The media docking device of claim 1, wherein the output circuit comprises at least one of following circuits:
a video interface circuit;
an audio circuit;
a universal serial bus circuit;
an instruction sending circuit; and
an internet circuit.

4. The media docking device of claim 1, wherein the processing circuit is configured to store a first password,
wherein the input circuit is configured to receive a second password, and the verification procedure comprises determining, by the processing circuit, whether the second password is identical to the first password,
wherein if the second password is identical to the first password, the processing circuit is configured to transmit the media data to the media play device through the output circuit.

5. The media docking device of claim 1, wherein the processing circuit is configured to store a first password,
wherein the verification procedure comprises determining, by the processing circuit, whether the media source device or the media play device is on a white list,
wherein if the media source device or the media play device is not on the white list, the processing circuit is configured to limit the transmission of the media data, the input circuit is configured to receive a second password, and the verification procedure comprises determining, by the processing circuit, whether the second password is identical to the first password,
wherein if the second password is identical to the first password, the processing circuit is configured to transmit the media data to the media play device through the output circuit and add the media source device or the media play device to the white list.

6. The media docking device of claim 5, wherein if the second password is not identical to the first password, the processing circuit is configured to interrupt a communicative connection and the transmission of the media data between the input circuit and the media source device, or interrupt a communicative connection and the transmission of the media data between the output circuit and the media play device.

7. The media docking device of claim 1, wherein the processing circuit is configured to store first biological information,
wherein the input circuit comprises a biological information receiving circuit configured to receive second biological information, wherein the verification procedure comprises determining, by the processing circuit, whether the second biological information and the first biological information matches.

8. The media docking device of claim 1, wherein an operation of the processing circuit limiting the transmission of the media data comprises masking a portion of the media data.

9. The media docking device of claim 1, wherein an operation of the processing circuit limiting the transmission of the media data comprises disabling the output circuit or the input circuit.

10. The media docking device of claim 1, wherein an operation of the processing circuit limiting the transmission of the media data comprises transmitting an instruction to the media play device such that the media data is not played by the media play device.

11. A media transfer method comprising:

transmitting, by a media source device, media data to a media docking device which is electrically connected to a media play device;

determining, by the media docking device, whether a verification procedure is passed for identifying if the media source device and the media play device are trusted devices;

if the verification procedure is passed, transmitting, by the media docking device, the media data to the media play device; and if the verification procedure is not passed, limiting, by the media docking device, a transmission of the media data such that the media data is not completely played by the media play device.

12. The media transfer method of claim 11, wherein the media docking device is configured to store a first password, and the media transfer method further comprises:

obtaining, by the media source device, a second password through a user interface and transmitting the second password to the media docking device, wherein the verification procedure comprises determining if the second password is identical to the first password.

13. The media transfer method of claim 11, further comprising:

providing, by the media source device, a user interface for selecting one of a plurality of modes of the verification procedure;

in a first mode of the modes, determining whether the media source device and the media play device are on a white list;

in a second mode of the modes, determining if the media source device is on the white list; and in a third mode of the modes, determining if the media play device is on the white list.

14. The media transfer method of claim 13, further comprising:

sending, by a remote device, an instruction to the media docking device through an internet for editing the white list.

15. The media transfer method of claim 13, wherein the media docking device is configured to store a first password, and the media transfer method further comprises:

obtaining, by the media source device, a second password through the user interface and transmitting the second password to the media docking device, wherein the verification procedure comprises determining whether the second password is identical to the first password.

16. The media transfer method of claim 15, further comprising:

if the second password is not identical to the first password, interrupting a communicative connection and the transmission of the media data between the media source device and the media docking device, or interrupting a communicative connection and the transmission of the media data between the media play device and the media docking device.

17. The media transfer method of claim 11, wherein the media docking device is configured to store first biological information, the media docking device further comprises a biological information receiving circuit configured to receive second biological information, wherein the verification procedure comprises determining whether the second biological information and the first biological information matches.

18. The media transfer method of claim 11, wherein the step of limiting the transmission of the media data comprises masking a portion of the media data.

19. The media transfer method of claim 11, wherein the step of limiting the transmission of the media data comprises disabling an output module or an input module of the media docking device.

20. The media transfer method of claim 11, wherein the step of limiting the transmission of the media data comprises sending an instruction to the media play device such that the media data is not played by the media play device.

* * * * *